Nov. 19, 1968   D. J. LAPERA   3,411,523
PRESSURE REGULATOR
Filed July 26, 1965
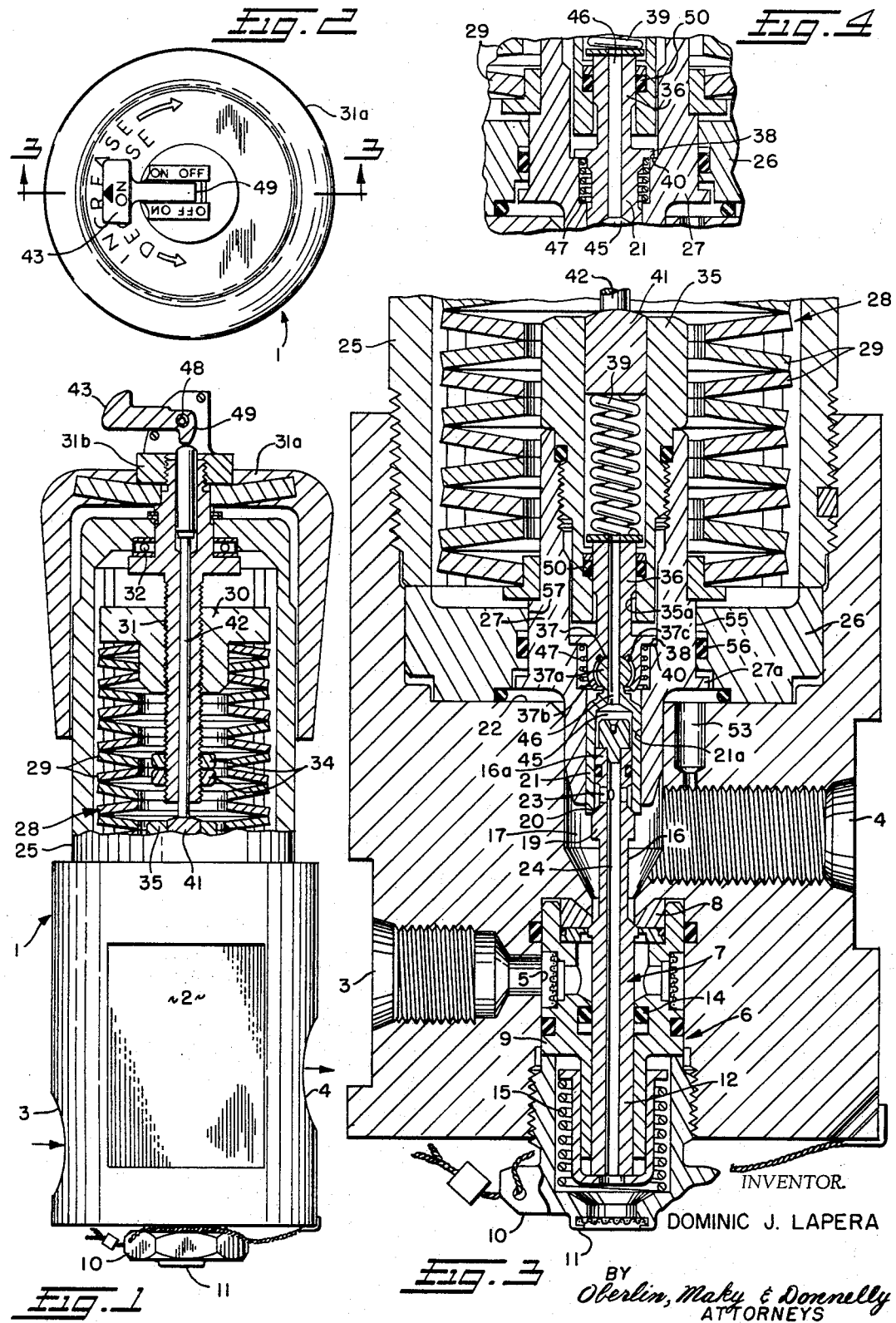
INVENTOR.
DOMINIC J. LAPERA
BY Oberlin, Maky & Donnelly
ATTORNEYS

United States Patent Office 3,411,523
Patented Nov. 19, 1968

3,411,523
PRESSURE REGULATOR
Dominic J. Lapera, Chardon, Ohio, assignor to Parker-Hannifin Corporation, Cleveland, Ohio, a corporation of Ohio
Filed July 26, 1965, Ser. No. 474,907
13 Claims. (Cl. 137—116.5)

ABSTRACT OF THE DISCLOSURE

A pressure regulator including an inlet valve for controlling the flow of fluid between inlet and outlet ports, a vent port, and a vent valve carried by a piston which vent valve is movable into engagement with the inlet valve for closing the vent port and opening the inlet valve.

The present invention relates generally as indicated to a pressure regulator and more particularly to a pressure regulator for high pressure air, other gases or liquids with which, for example, a primary pressure of as much as 10,000 p.s.i. may be regulated so as to produce any desired secondary pressure of from 0 to 4500 p.s.i.

It is a principal object of this invention to provide a pressure regulator of the character indicated in which the regulated pressure may be adjusted over a wide range and accurately maintained at adjusted value.

It is another object of this invention to provide a pressure regulator in which the inlet and vent valves thereof are substantially pressure balanced whereby regulated pressure is maintained to a very high degree of accuracy irrespective of fluctuations in source pressure.

It is another object of this invention to provide a spring set pressure regulator of the character indicated having externally controllable spring means for opening the vent valve without changing such spring setting.

It is another object to provide a regulator of the type described in which a guided and fluid pressure balanced vent valve is formed in two parts with a universal connection therebetween to faciliate alignment of said ends with their guides.

It is another object to provide a pressure regulator of the type described in which a vent valve for conrtolling a vent port is carried by an actuator that controls the outlet pressure and in which spring means is provided under the control of an external operator for moving the vent valve to its venting position independently of movements of the actuator.

It is another object of this invention to provide a pressure regulator of the character indicated having novel stop means to preclude overloading of the regulator spring when adjusting the regulated pressure.

Other objects and advantages of the present invention will become apparent as the following description proceeds.

To the accomplishments of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a side elevation view, partly in central vertical cross-section, of a preferred form of pressure regulator embodying the present invention;

FIG. 2 is a top plan view of FIG. 1;

FIG. 3 is an enlarged cross-section view along line 3—3, FIG. 2 of the lower inlet and vent valve portion of the regulator; and FIG. 4 is a fragmentary cross-section view of another form of the vent valve.

Referring now more particularly to the drawing, the pressure regulator 1 herein comprises a valve housing 2 having an inlet port 3 adapted for connection to a source of fluid under high primary pressure and an outlet port 4 in which it is desired to maintain reduced secondary pressure within close limits, said outlet port 4 being adapted for connection with a fluid circuit wherein the secondary pressure opertes a fluid motor or the like.

The inlet port 3 intersects a bore 5 in said housing 2 in which is disposed the body and seat assembly 6 for the inlet valve 7, the seat 8 preferably being of nylon or like plastic material. As evident, the inlet valve 7 is adapted to be moved into and out of engagement with said seat 8 to control flow of fluid from the inlet port 3 to the outlet port 4 to maintain regulated pressure in the outlet port 4. The retainer 9 is held in the housing 2 by a plug 10 which has a screened vent port 11 through which excess pressure in the outlet port 4 is vented to the atmosphere in a manner presently to be described. The stem portion 12 of the inlet valve is guided in the retainer 9 and sealed by the O-ring 14 on substantially the same diameter as the seat 8. Said inlet valve 7 is biased by the spring 15 toward seated position. Because said inlet valve 7 is substantially fluid pressure balanced, the biasing spring 15 may be relatively weak.

Inlet valve 7 has an integral extension 16 within outlet chamber 17. A vent valve seat member 19 is formed on the extension and cooperates with the seat 20 of a hollow vent valve 21 to control venting ofoutlet port 4. When the lower end of vent valve 21 is spaced from seat member 19 the outlet port 4 is vented to the atmosphere through the passages 23 and 24 in inlet valve 7 which lead to the screened vent port 11.

A spring housing 25 has threaded engagement with the valve housing 2 and serves to clamp fixedly in place an adapter ring 26 in which an actuator piston 27 is movable downwardly and upwardly according to the magnitude of the field pressure in the outlet 4 as compared with the force exerted on the piston 27 by the regulator spring assembly 28 which, in this case, preferably comprises a stack of dished spring washers 29. Upward movement of piston 27 is limited by engagement of flange 72a with adapter ring 26.

Regulator spring follower 30, preferably of hex shape, is axially movable but nonrotatable in the hex broach through spring housing 25 and has threaded engagement with an adjusting screw 31 that is attached to cup-shaped sleeve 31b by a threaded member 31b, there being an axial thrust bearing 32 between screw 31 and the upper end of the spring housing 25 to faciliate rotation of screw 31 to move the spring follower 30 to vary the mechanical load on the piston 27 through the regulator spring assembly 28. In order to prevent overloading of the regulator spring assembly 28, screw 31 has lock nuts 34, 34 thereon to limit the extent of downward adjustment of the spring follower 30.

Screwed into the upper end of the piston 27 is a tubular member 35 which provides a sliding seal with the upper portion 36 of vent valve 21 on a diameter which is substantially equal to the diameter of the circular contact between vent valve 21 and vent seat member 19, said upper portion 36 having a universal ball joint connection 37 with the lower portion of vent valve 21 to accommodate misalignment of bore 35a of tubular member 35 with respect to bore 21a of piston 27 in which vent valve 21 is closely guided. The ball 37a in such joint has a small clearance with the surrounding sleeve portion 37b to permit slight sideward shifting therein to further facilitate accommodation of such misalignment and has an O-ring packing 37c to prevent leakage between the interior and exterior portions of the universal joint. If desired, vent valve 21 may be formed in one piece as shown in FIG. 4. In either event, vent valve 21 has a flange 38 which is biased by the spring 39 against the shoulder 40 in the piston 27, said spring 39 being compressed when the follower 41 is held in the position shown by the rod 42 extending through the sleeve 31 and having its upper end engaged with the vent lever 43 when in the position shown.

The upper end 16a of the inlet valve 7 is sealed in the bore of vent valve 21 and the chamber 45 therebetween is vented through the passage 46 of said vent valve 21 and through the spring housing 25.

Assuming that the vent lever 43 is in the "on" position (operation of this feature is later explained) and that the regulated outlet pressure has been desirably adjusted by turning the screw 31 by means of sleeve 1a, it can be seen that if the outlet pressure decreases to a value less than desired, the regulator spring assembly 28 will move the piston 27 downwardly. Because spring 39 exerts greater force downwardly on vent valve 21 than spring 47 exerts for urging vent valve 21 upwardly, flange 38 will remain in engagement with shoulder 40 of the piston 27 and vent valve 21 will, through engagement with vent valve seat member 19, move inlet valve 7 downwardly against spring 15, thus to allow higher pressure fluid to flow from inlet 3 into outlet 4 until such time as the outlet pressure rises to the desired regulated pressure. At that time, the outlet pressure acting on piston 27 will move it upwardly against regulator spring assembly 28 to permit spring 15 to move the inlet valve 7 into engagement with its seat 8.

Now, if the regulated pressure in outlet port 4 becomes greater than the desired set pressure, it will act on piston 27 through passage 53 to move the same still further upwardly against spring assembly 28, and because of the engagement of the shoulder 40 with the flange 38, vent valve 21 will separate from seat 19 and pressure in outlet 4 will vent through passages 23, 24 and port 11 to atmosphere. If the pressure in outlet 4 continues to rise, piston 27 will continue to move upwardly to further separate vent valve 21 from seat 19 to increase the venting rate. Thus vent valve 21 acts as a relief valve to prevent excessive pressure buildup in outlet 4. When the excess pressure in outlet 4 has been relieved as just described, vent valve 21 will return to seat 19 to close off the vent passage.

If it is desired to vent outlet 4 due to malfunction or circuit failure, while maintaining inlet valve 7 closed, vent lever 43 can be shifted to its vertical or "off" position to permit upward movement of rod 42 and spring follower 41, thus to permit decompression of spring 39, whereupon spring 47 will move flange 38 away from the shoulder 40 thus to open vent valve 21 for venting outlet 4 to atmosphere. Lever 43 is yieldably retained in the "on" position due to the eccentric location of its pivot 48 with reference to the axis of rod 42. Furthermore, the radius of cam 49 initally increases so that when lever 42 is swung to vertical position it must first slightly move rod 42 and follower 41 down before spring 39 is allowed to decompress to force follower 41 and rod 42 upwardly. Operation of vent lever 43 for opening vent valve 21 has no effect on the load setting of springs 29 by sleeve 31a and the unit is automatically returned to the present pressure setting for outlet 4 upon operation of vent lever 43 to close vent valve 21. Lever 43 may be adapted for operation by a solenoid, motor, or other means besides manual.

Because the area of inlet seat 8 and the area of stem portion 12 sealed by seal 14 are substantially equal, fluctuation in the pressure in the inlet 3 has substantially no effect on the amount of force required to be applied on the inlet valve 7 to move the same away from its seat 8. Such force will depend substantially entirely on the amount of bias of spring 15 and the friction of O-ring 14 against stem 12 of inlet valve 7. Similarly, since the diameter of the contact circle between vent valve 21 and seat 19 and the diameter of the seal 50 are substantially equal, fluid pressure on vent valve 21 is substantially balanced so that springs 39 and 47 acting thereon may be relatively weak but with spring 39 stronger than the combined strength of springs 47 and 15 to cause vent valve 21 to move down in unison with piston 27 during opening movement of inlet valve 7. In the upward movement of piston 27, it lifts vent valve 21 to open the latter after inlet valve 7 is closed. Such upward movement of piston 27 effects slightly additional compression of spring 39 because at that time follower 41 is held against upward movement by rod 42 and vent lever 43.

I claim:

1. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure of fluid in the outlet port for urging the piston away from the inlet valve, a second spring biasing the vent valve against the piston whereby the vent valve and piston move in unison toward or away from the inlet valve according to whether the force exerted by the first spring upon the piston is greater or lesser than the force exerted upon the piston by fluid in the outlet port, said vent valve when moving toward the inlet valve being engageable therewith for closing the vent port and for moving the inlet valve to open position, and means for releasing said second spring whereby said vent valve may move toward its open position independently of piston movement.

2. The pressure regulator of claim 1 in which the piston has a pair of bore sections, said vent valve has a first part slidable in one of said sections and another part slidable in the other of said sections, said parts being joined by a universal connection to facilitate alignment of said parts with said bore sections, said universal connection including a ball on one of said parts received in a sleeve on the other of said parts with a clearance therebetween to permit sideward movement of said parts relative to each other further to facilitate alignment of said parts with said bore sections.

3. The pressure regulator of claim 1 in which said releasing means includes a rod movable for compressing and decompressing said second spring.

4. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure of fluid in the outlet port for urging the piston away from the inlet valve, first means maintaining the vent valve in a fixed position relative to the piston whereby the vent valve and piston move in unison toward or away from the inlet valve according to whether the force exerted by the first spring upon the piston is greater or lesser than the force exerted upon the piston by the fluid in the outlet port, said vent valve when moving toward the inlet valve being engageable therewith for closing the vent port and for moving the inlet valve to open position, second means for releasing the first means whereby the vent valve may be moved relative to the piston and away from said inlet valve by a third means acting on said vent valve, said vent valve being exposed to fluid in the outlet port and being balanced relative thereto.

5. The pressure regulator of claim 4 in which the vent valve is in the form of a hollow sleeve, the vent port extends through the inlet valve, and the inlet valve is balanced relative to fluid pressure acting thereon in all positions of the inlet valve and the vent valve.

6. The pressure regulator of claim 4 in which there is a means for maintaining the vent valve in its open position when moved thereto without movement of the piston.

7. The pressure regulator of claim 4 in which the vent valve is fluid pressure balanced in all of its positions for facilitating movement thereof independently of movement of the piston.

8. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure of fluid in the outlet port for urging the piston away from the inlet valve, a second spring maintaining the vent valve in a fixed position relative to the piston whereby the vent valve and piston move in unison toward or away from the inlet valve according to whether the force exerted by the first spring upon the piston is greater or lesser than the force exerted upon the piston by fluid in the outlet port, said vent valve when moving toward the inlet valve being engageable therewith for closing the vent port and for moving the inlet valve to open position, means for releasing said second spring whereby said vent valve may move toward its open position independently of piston movement, and a third spring for moving the vent valve to its open position when said second spring is released.

9. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure of fluid in the output port for urging the piston away from the inlet valve, a second spring maintaining the vent valve in a fixed position relative to the piston whereby the vent valve and piston move in unison toward or away from the inlet valve according to whether the force exerted by the first spring upon the piston is greater or lesser than the force exerted upon the piston by fluid in the outlet port, said vent valve when moving toward the inlet valve being engageable therewith for closing the vent port and for moving the inlet valve to open position, means for releasing said second spring whereby said vent valve may move toward its open position independently of piston movement, said second spring when not released pressing the vent valve into engagement with a shoulder on the piston whereby the piston and vent valve move in unison, and a third spring for moving the vent valve away from said shoulder to a position for opening said vent port when said second spring is released.

10. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure of fluid in the outlet port for urging the piston away from the inlet valve, first means maintaining the vent valve in a fixed position relative to the piston whereby the vent valve and piston move in unison toward or away from the inlet valve according to whether the force exerted by the first spring upon the piston is greater or lesser than the force exerted upon the piston by the fluid in the outlet port, said vent valve when moving toward the inlet valve being engageable therewith for closing the vent port and for moving the inlet valve to open position, second means for releasing the first means whereby the vent valve may be moved relative to the piston and away from said inlet valve by a third means acting on said vent valve, said vent valve being exposed to fluid in the outlet port and being balanced relative thereto, said first means including a second spring and said third means comprising a spring acting in opposition to and with less force than the second spring.

11. A pressure regulator comprising a housing having an inlet port, an outlet port, and a vent port, an inlet valve controlling communication between the inlet and outlet ports, an actuator piston, a vent valve slidably mounted in the piston and controlling communication between the outlet and vent ports, a first spring urging the piston toward the inlet valve, said piston having an area subject to pressure or fluid in the outlet port for urging the piston away from the inlet valve, a second spring urging the vent valve toward the inlet valve whereby the vent valve and piston move in unison toward or away from the inlet valve according to whether the force exerted by the first spring upon the piston is greater or lesser than the force exerted upon the piston by fluid in the outlet port, said vent valve when moving toward the inlet valve being engageable therewith for closing the vent port and for moving the inlet valve to open position, and means for releasing said second spring whereby said vent valve may move toward its open position independently of piston movement, said releasing means including a rod movable for compressing and decompressing said second spring, and a cam pivotally mounted adjacent one end of said rod for moving said rod, the pivotal axis for said cam being eccentric with reference to the axis of said rod and the radius of said cam first increasing and then decreasing whereby rotation of said cam first compresses and then decompresses said second spring.

12. A pressure regulator comprising a housing having an inlet and outlet port, an inlet valve controlling communication between such ports, an actuator piston, a vent valve carried by the piston and movable therewith, a vent port through said inlet valve, said vent valve controlling communication between the outlet and vent ports, said vent valve also being engageable with said inlet valve for opening and closing the latter, said vent valve having a bore in which an extension of said inlet valve is sealed, a passage in said vent valve venting the chamber formed between said bore and extension to the atmosphere, and a packing sealing the exterior of said vent valve from said passage.

13. The pressure regulator of claim 12 wherein said piston has a pair of bore sections, said vent valve has a first part in one of said sections and another part in the other of said sections, said parts being joined by a loose connection for accommodating axial misalignment of said parts, said loose connection comprising a ball on one of said parts seated in a socket in the other of said parts with a clearance therebetween to permit sideward movement of said parts relative to each other to facilitate alignment of said parts with said bore sections, said packing being disposed between the ball and socket.

References Cited

UNITED STATES PATENTS

| 968,944 | 8/1910 | Henry | 251—266 |
| 2,564,938 | 8/1951 | Warren | 285—261 |
| 2,707,966 | 5/1955 | Taplin | 137—116.5 |
| 2,972,466 | 2/1961 | Allen | 137—614.19 |
| 3,101,742 | 8/1963 | Kellogg | 137—627.5 |

FOREIGN PATENTS 582,051 11/1946 Great Britain.

WILLIAM F. O'DEA, *Primary Examiner.*

H. COHN, *Assistant Examiner.*